UNITED STATES PATENT OFFICE.

CHARLES W. COLONY, OF SANDY CREEK, NEW YORK.

FIRE AND WATER PROOF PAINT.

SPECIFICATION forming part of Letters Patent No. 304,911, dated September 9, 1884.

Application filed July 30, 1884. (No specimens.)

*To all whom it may concern:*

Be it known that I, CHAS. W. COLONY, a citizen of the United States, residing at Sandy Creek, in the county of Oswego and State of New York, have invented certain new and useful Improvements in Fire and Water Proof Paints; and I do declare the following to be a full, clear, and exact description of the invention, such as will enable others skilled in the art to which it appertains to make and use the same.

This invention has relation to fire-proof and water-proof paints; and it consists in the novel composition of the following ingredients, compounded together in the proportions and in the manner hereinafter set forth.

In order to prepare the black paint, I take one gallon of coal-tar or gas-tar; four pounds of pulverized stone or slate; one pound of common salt; one pound of red lead or white lead; one-half pound of alum; one-half pound of Venetian red; one-half pound of asbestus; one pound of resin; one-half pint of linseed-oil. I evaporate by heat the tar to a suitable thickness, and then add the other ingredients. The mixture is to be applied while hot.

To prepare colored paints I reverse the quantities of tar and oil and use a pigment of the desired color. In this case the mixture should be made over a slow fire, and may be applied either hot or cold.

Having described this invention, what I claim, and desire to secure by Letters Patent, is—

The herein-described fire-proof and water-proof paint, consisting of coal-tar, pulverized stone or slate, common salt, red or white lead, alum, Venetian red, asbestus, resin, and linseed-oil, compounded together in the proportions and in the manner substantially as set forth.

In testimony whereof I affix my signature in presence of two witnesses.

CHARLES W. COLONY.

Witnesses:
    A. M. BROWN,
    M. M. EARL.